United States Patent

Clements et al.

[15] 3,706,890

[45] Dec. 19, 1972

[54] STAIRCASE COUNTER

[72] Inventors: John Anthony Clements, Shipton Under Wychwood; Alan Patrick Goss, Carterton; Brian Shepherd, Witney, all of England

[73] Assignee: Smiths Industries Limited, London, England

[22] Filed: March 5, 1971

[21] Appl. No.: 121,334

[52] U.S. Cl. ....................307/225, 307/227, 307/246

[51] Int. Cl. ..............................................H03k 25/04

[58] Field of Search...............307/227, 225, 223, 226

[56] References Cited

UNITED STATES PATENTS

| | | | |
|---|---|---|---|
| 3,105,158 | 9/1963 | Nichols | 307/227 X |
| 3,121,803 | 2/1964 | Watters | 307/227 X |
| 3,150,271 | 9/1964 | Robertson | 307/227 |
| 3,435,193 | 3/1969 | Aitchison | 307/227 X |

*Primary Examiner*—John S. Heyman
*Attorney*—William D. Hall, Elliott I. Pollock, Fred C. Philpitt, Charles F. Steininger and Robert P. Priddy

[57] ABSTRACT

An electrical dividing circuit in which an input circuit including an input capacitor supplies pulses of predetermined voltage amplitude to the input of a transistor switching arrangement that for each pulse causes a flow of charging current to a storage capacitor until a predetermined voltage difference exists between the input and the storage capacitor. A feedback arrangement, comprising a further transistor or alternatively a high value resistor, maintains the input at a reference voltage dependent on the storage capacitor voltage in between successive input pulses, each of which supplements the reference voltage resulting from the immediately preceding input pulse. The storage capacitor voltage thus increases by a predetermined voltage increment for each input pulse until it reaches a predetermined value, corresponding to a predetermined number of said increments, when it triggers an output circuit to provide an output pulse.

6 Claims, 2 Drawing Figures

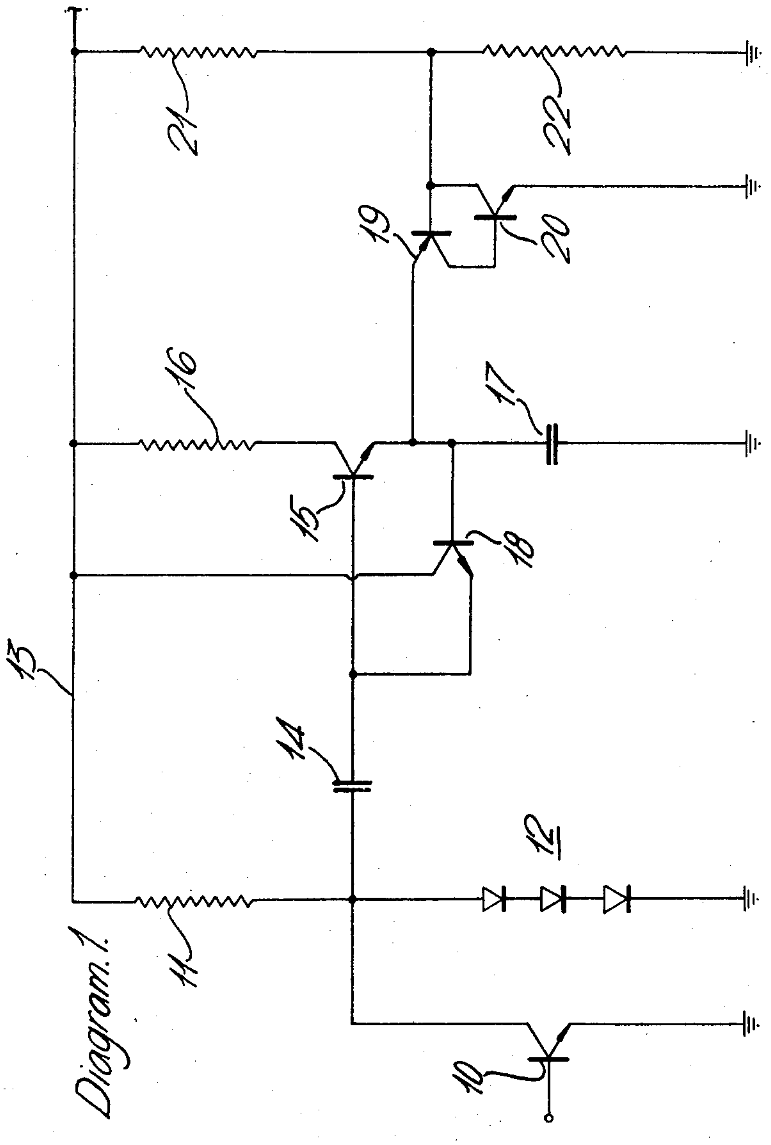
Diagram. 1.

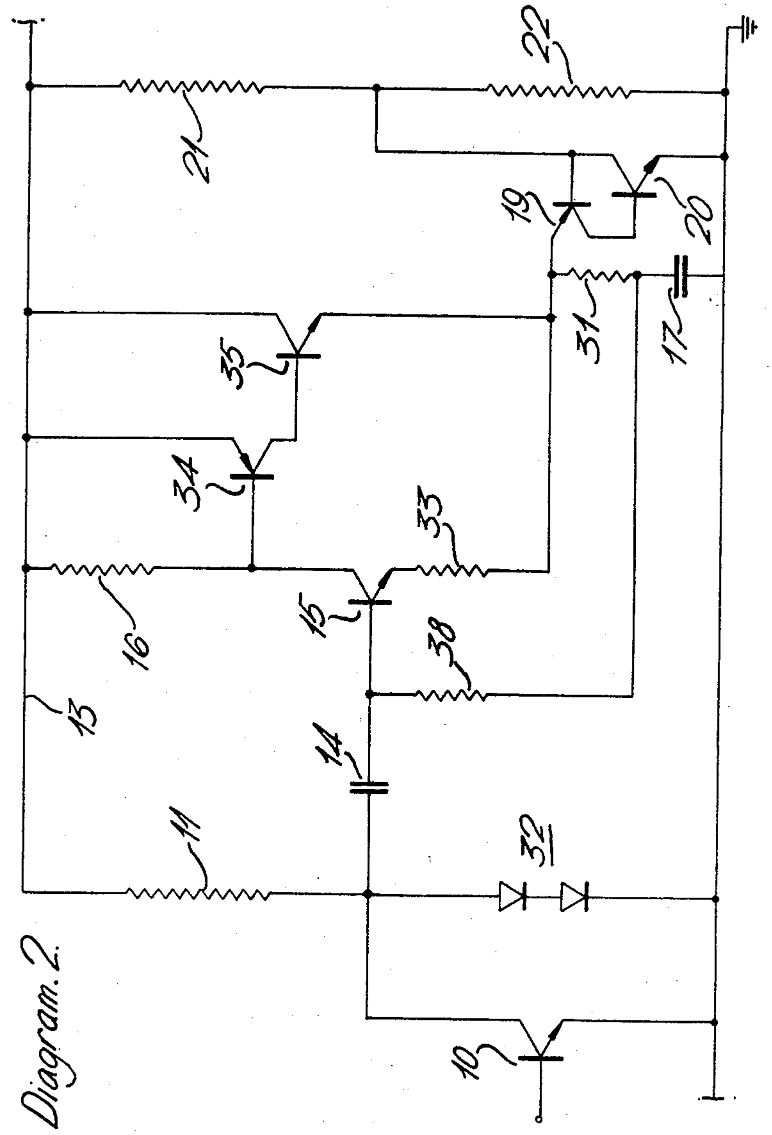
Diagram. 2.

STAIRCASE COUNTER

This invention relates to electrical dividing circuits.

In the past, electrical dividing circuits incorporating capacitors have involved the sequential transfer of a predetermined quantity of charge to or from a capacitor. When the total charge stored in the capacitor produces a predetermined voltage difference across the capacitor's terminals, an output circuit is triggered, resetting the dividing circuit. Such a circuit is very dependent upon the accuracy of the capacitor and the constancy of the predetermined quantity of charge transferred so that for stable division to be achieved stable, accurate capacitors have been necessary, usually at some expense which it is an object of the present invention to reduce.

According to this invention there is provided an electrical dividing circuit comprising capacitance means; switching means which has an input and which is coupled to the capacitance means for controlling the supply of charging current thereto, the switching means being responsive to difference in voltage between said input and said capacitance means to supply current to charge the capacitance means only during the existence of a condition in which said voltage difference exceeds a predetermined threshold value; pulsing means coupled to said input and operable to apply thereto a pulse of predetermined voltage amplitude to establish said condition transistorily; feedback means coupled to said input and responsive to the voltage at said capacitance means, said feedback means being operative in the absence of said condition to bias said input to a potential dependent upon the voltage at said capacitance means; and an output circuit coupled to said capacitance means to provide an output signal when, following successive operations of said pulsing means, the voltage at said capacitance means reaches a predetermined value corresponding to a total of voltage increments each related by a predetermined amount to the predetermined voltage amplitude of each pulse applied to said capacitance means by the switching means.

It will be appreciated that in accordance with this invention, the change in charge stored by the capacitor is generally immaterial and hence the capacitor's capacitance value may fluctuate considerably with little or no effect upon the division accuracy as long as the voltage increments are maintained substantially constant at a predetermined voltage.

The switching means may comprise at least one transistor. Preferably said pulsing means comprises further capacitance means coupled to said input, means operable to generate a pulse of a predetermined amplitude, and means to apply the generated pulse to said input via said further capacitance means.

Two exemplary electrical dividing circuits according to this invention will now be described with reference to the accompanying circuit diagrams 1 and 2 respectively.

In the circuit diagram 1, an input circuit comprises an n-p-n transistor 10 connected by its emitter to ground and by its collector to the junction between a resistor 11 and a three component series diode chain 12. The resistor 11 is connected to a positive line 13 and the chain 12 is connected to ground.

A capacitor 14 has one side connected to the junction between the resistor 11 and the chain 12 and its other side connected to the base of an n-p-n transistor 15. The collector of the transistor 15 is connected through a resistor 16 to the line 13 and the emitter of the transistor 15 is connected to a grounded capacitor 17. An n-p-n transistor 18 has its base connector to the capacitor 17, its emitter connected to the said other side of the capacitor 14, and its collector connected to the line 13.

An output circuit comprises a p-n-p transistor 19, an n-p-n transistor 20, and two resistors 21 and 22 connected between the line 13 and ground. The emitter of the transistor 19 is connected to the capacitor 17 and the base of the transistor 19 is connected to the junction between the resistors 21 and 22. The transistor 20 has its base connected to the collector of the transistor 19, its collector connected to the base of the transistor 19, and its emitter connected to ground. Each of the three diodes of chain 12 is effectively a transistor's base-emitter configuration, and all the transistors used have a base-emitter potential difference of $V_{BE}$.

In use, and before the application of a first input pulse to the base of the transistor 10, the transistor 10 is ON. The transistors 15 and 18 are OFF and the capacitors 14 and 17 are completely discharged. On the application of a first negative-going input pulse, the transistor 10 turns OFF. In consequence, the potential at the junction between the resistor 11 and the chain 12 rises by a predetermined amplitude of approximately $3V_{BE}$. A voltage change of like amplitude appears at said other side of the capacitor 14 which turns ON the transistor 15 and thereby charges the capacitor 17. The time-constant of charging the capacitor 17 connected in the emitter-collector current path of transistor 15 is very much shorter than that of the capacitor 14 connected in the base circuit of transistor 15. Accordingly the potential at the said other side of capacitor 14 falls very slowly compared with the rise in potential at capacitor 17, and when the potential at the capacitor 17 reaches $2V_{BE}$ the transistor 15 turns OFF. When subsequently the input pulse ceases, the potential at the said other side of the capacitor 14 drops and the transistor 18, in responding to this drop, turns ON. Conduction of transistor 18 raises and maintains the potential at said other side of the capacitor 14 at approximately $1V_{BE}$, that is to say at a potential $1V_{BE}$ less than that at the capacitor 17.

At the occurrence of the next input pulse the potential at the one side of the capacitor 14 is again raised by $3V_{BE}$. The potential at the other side of the capacitor 14 also rises by $3V_{BE}$, from $1V_{BE}$ to $4V_{BE}$, so that, as before, the transistor 15 turns ON and remains ON until the potential of the capacitor 17 has risen a further $1V_{BE}$ to $3V_{BE}$. The transistor 18 turns ON at the end of the said next input pulse to raise and maintain the potential at said other side of the capacitor 14 at $2V_{BE}$.

In like manner, for each input pulse thereafter the potential at the capacitor 17 rises by a voltage increment of $1V_{BE}$.

The potential divider formed by resistors 21 and 22, is arranged to provide a voltage at the junction between the resistors of $5V_{BE}$. The transistor 19 therefore turns ON when the potential at the capacitor 17 rises to $1V_{BE}$ above $5V_{BE}$, that is after the fifth input pulse and at a voltage representing a total of five voltage increments. The transistor 20 turns ON as soon as the transistor 19 turns ON whereby each of the transistors 19 and 20 is held in its conducting state and the capacitor 17 is allowed to discharge through the transistors 19 and 20 to approximately $1V_{BE}$, i.e. the maintaining volts of transistors 19 and 20. The flow of discharging current represents an output signal of the dividing circuit. Thus, the dividing circuit provides an output signal for every fifth input pulse, that is the circuit provides a division ratio of 5 to 1.

The application of the next input pulse after this output signal has been derived, causes, in the manner described above, the potential of capacitor 17 to rise from $1V_{BE}$ to $2V_{BE}$. It will be noted therefore that normally in use, that is any time after the first division sequence has been completed, the application of each input pulse results in the potential of the capacitor 17 rising by an increment of $1V_{BE}$. The only exception to this, as has been explained above, is the very first input pulse which causes the potential of the capacitor to rise by $2V_{BE}$. In any event, the division ratio is not affected, the ratio being five to one for the first division sequence and subsequent division sequences.

A modification of the above described circuit, which modification (by providing more loop gain than provided above with the two transistors 15 and 18) enables capacitor 17 to charge up even more rapidly, is shown in circuit diagram 2. The three component series diode chain 12 of the previous circuit is replaced by a similar two component series diode chain 32, transistor 18 of the previous circuit is omitted, a resistor 38 connects the base of transistor 15 (i.e. said other side of capacitor 14) to the capacitor 17. The capacitor 17 is also connected by two resistors 31, 33 to the emitter of transistor 15. The collector of transistor 15 is connected to the base of a p-n-p transistor 34, the emitter of which is connected to positive line 13 and the collector of which is connected to the base of an n-p-n transistor 35. The collector of transistor 35 is connected to line 13 and its emitter is connected to the junction of resistances 31, 33 and to the emitter of transistor 19.

In use, and before the application of a first input pulse to the base of transistor 10, the transistor 10 is ON, the transistors 15, 34 and 35 are OFF, and the capacitors 14 and 17 are completely discharged. On the application of a first negative-going input pulse, the transistor 10 turns OFF. In consequence, the potential at the junction between the resistor 11 and the two component diode chain 32 rises by a predetermined amplitude of approximately $2V_{BE}$ (since each diode is effectively the base and emitter of a transistor). An equivalent voltage change appears at said other side of the capacitor and turns ON the transistor 15. Accordingly transistor 34 comes ON and turns ON transistor 35 so as to pass current therethrough to charge the capacitor 17. The time-constant of charging the capacitor 17 (connected in the emitter-collector current path of transistor 35) is very much shorter than that of the capacitor 14 (connected in the base circuit of transistor 15). Accordingly the potential at the said other side of capacitor 14 falls very slowly compared with the rise in potential at capacitor 17 which charges comparatively rapidly. When the potential at capacitor 17 rises to approximately $1V_{BE}$ the transistor 15 turns OFF thereby turning OFF transistors 34 and 35 sequentially.

Subsequently, when the input pulse ceases, the voltage at said other side of capacitor 14 instead of falling is maintained at a potential according substantially to the potential of capacitor 17, i.e. at approximately $1V_{BE}$, by the comparatively high value resistor 38.

At the occurrence of the next input pulse, the potential at said one side of the capacitor 14 again rises to $2V_{BE}$. The voltage rise at said other side of capacitor 14 rises similarly from $1V_{BE}$ to $3V_{BE}$. The transistors 15, 34 and 35 thus turn ON until the potential of the capacitor 17 has risen a further $1V_{BE}$ to $2V_{BE}$ whereafter capacitor 17 acting through high value resistor 38 maintains the voltage of said other side of capacitor 14 at $2V_{BE}$.

In like manner, for each input pulse thereafter, the potential at capacitor 17 rises by a voltage increment or step of $1V_{BE}$.

With the output circuit (comprising transistors 19, 20 and resistors 21, 22) arranged so that a voltage of $5V_{BE}$ appears at the junction of resistors 21 and 22, then the transistor 19 turns ON when the potential at the capacitor 17 rises to $1V_{BE}$ above $5V_{BE}$. This occurs after the sixth input pulse of the first sequence of pulses, that is to say at a voltage representing a total of six voltage increments or steps. As in the previously described circuit, the capacitor 17 discharges to $1V_{BE}$ through the transistors 19 and 20, the flow of discharging current representing an output signal of the dividing circuit. However, during the next and every subsequent sequence of five input pulses, the potential at capacitor 17 rises in five steps of $1V_{BE}$ to $6V_{BE}$ so that an output signal, represented by the flow of discharging current from capacitor 17, is provided for every fifth input pulse subsequent to the very first six input pulses. Thus, in general use, the circuit of diagram 2 provides a division ratio of 5 to 1.

Conveniently, in this last described circuit of diagram 2, the capacitance value of capacitor 17 is fifty times that of capacitor 14, and resistors 31 and 38 have resistive values of the order of 50 ohms and 10 kilo-ohms respectively.

Either of the above circuits may be incorporated in an electronic speedometer for a vehicle.

It will be appreciated that various division ratios may be achieved by each of the exemplary circuits described above. The amplitude of the pulse applied to the one side of the capacitor 14 may be altered; and/or the potential at the junction between the resistors 21 and 22 may be varied, e.g. by using a variable resistor instead of one of the fixed resistors 21 and 22, or by replacing either one of these fixed resistors by a fixed resistor of different resistance value, or by replacing resistor 22 by a set number of diodes.

Dividing circuits of diagrams 1 and 2 may be arranged in series or in parallel to increase dividing ratios as required. For example, a parallel combination of a six-to-one dividing circuit and a seven to one dividing circuit provides a total division ratio of forty-two to one when the outputs are taken in coincidence.

It will be appreciated that in each of the exemplary circuits described above, the absolute value of capacitance of the capacitors 14 and 17 are not critical because the capacitors are charged up by predetermined voltage steps. In consequence, capacitors having comparatively wide drift can be used without upsetting the division accuracy of the circuit. However, when in the circuit of diagrams 1 and 2, the capacitors must be capable of being discharged within the period between successive input pulses, and of being charged during the ON period of each input pulse.

We claim:

1. An electrical dividing circuit comprising:

first capacitance means (14) having input and output terminals;

second capacitance means (17);

a source of electric current (13);

switching means (15) comprising a controllable impedance device having at least first and second electrodes between which there is an electric current path and a control electrode to which a voltage signal is to be applied to control the electric current flow between said first and second electrodes, means coupling the electric current source to said first electrode, means coupling said second capacitance means to said second electrode, and means coupling the output terminal of said first capacitance means to said control electrode to enable the current flow between said source and said second capacitance means to be controlled in accordance with the magnitude of voltage at the output terminal of said first capacitance means, means for controlling the current flow from said source to said second capacitance means which causes a change in the voltage across said second capacitance means to occur only during the existence of a condition in which the difference between the voltage at the output terminal of said first capacitance means and the voltage across said second capacitance means exceeds a predetermined threshold value;

pulsing means (10, 12) coupled to the input terminal of said first capacitance means and operable to generate and apply thereto a pulse of predetermined voltage amplitude to establish said condition transitorily;

feedback means (18) coupled to the output terminal of said first capacitance means and responsive to the voltage across said second capacitance means, said feedback means being operative in the absence of said condition to apply to the output terminal of said first capacitance means a bias voltage dependent upon the voltage across said second capacitance means;

and an output circuit (19, 20) coupled to said second capacitance means to provide an output signal when the voltage across said second capacitance means reaches a predetermined value following successive operations of said pulsing means.

2. An electrical dividing circuit as claimed in claim 1, wherein said controllable impedance device is a transistor connected in an emitter-follower configuration.

3. An electrical dividing circuit as claimed in claim 1, wherein said feedback means comprises a transistor coupled in an emitter-follower configuration between said second capacitance means and the output terminal of said first capacitance means.

4. An electrical dividing circuit as claimed in claim 1, wherein said feedback means comprises a resistance coupled between said second capacitance means and the output terminal of said first capacitance means.

5. An electrical dividing circuit as claimed in claim 2, wherein said feedback means comprises means operable in the absence of said condition to apply to the output terminal of said first capacitance means a bias voltage which is an integer multiple of the base-emitter voltage of said transistor.

6. An electrical dividing circuit comprising:

capacitance means;

switching means for controlling the supply of charging current to the capacitance means including an input, a transistor having base, emitter and collector electrodes and which is connected in an emitter-follower configuration, means coupling the base electrode to said input, and means coupling the emitter electrode to said capacitance means to enable the switching means to respond to difference in voltage between said input and said capacitance means to supply current to charge the capacitance means only during the existence of a condition in which said voltage difference exceeds a predetermined threshold value;

pulsing means comprising further capacitance means coupled to said input, means operable to generate a pulse of predetermined voltage amplitude comprising a plurality of semiconductor junctions each having electrical characteristics substantially identical to the electrical characteristics of the base-emitter junction of said transistor, and means to apply the generated pulse to said input via said further capacitance means to establish said condition transitorily;

feedback means coupled to said input and responsive to the voltage at said capacitance means, and comprising means operable in the absence of said condition to bias said input to a voltage which is dependent upon the voltage at said capacitance means and which is an integer multiple of the base-emitter voltage of said transistor;

and an output circuit coupled to said capacitance means to provide an output signal when the voltage at said capacitance means reaches a predetermined value following successive operations of said pulsing means.

* * * * *

PO-1050
(5/69)

UNITED STATES PATENT OFFICE
CERTIFICATE OF CORRECTION

Patent No. 3,706,890 Dated December 19, 1972

Inventor(s) JOHN ANTONY CLEMENTS, ALAN PATRICK GOSS, and BRIAN SHEPHERD

It is certified that error appears in the above-identified patent and that said Letters Patent are hereby corrected as shown below:

Foreign Application Priority Date

March 6, 1970 Great Britain . . . . . . . . . . 10811/70

Title page, section [72] the name of the first Inventor should read "John Antony Clements".

Title page, section [56] Attorney, "Robert P. Priddy" should be "Robert R. Priddy". The name "George Vande Sande" should be added.

Signed and sealed this 1st day of May 1973.

(SEAL)
Attest:

EDWARD M. FLETCHER, JR.
Attesting Officer

ROBERT GOTTSCHALK
Commissioner of Patents